D. J. MURNANE.
APPARATUS FOR FORMING SHEETS OF GLASS.
APPLICATION FILED JULY 5, 1907.

901,725.

Patented Oct. 20, 1908.

2 SHEETS—SHEET 2.

Witnesses
A. J. McCauley
Nells L. Church

Inventor:
Daniel J. Murnane
by Bakewell & Cornwall
Att'ys.

UNITED STATES PATENT OFFICE.

DANIEL J. MURNANE, OF KIRKWOOD, MISSOURI.

APPARATUS FOR FORMING SHEETS OF GLASS.

No. 901,725.

Specification of Letters Patent.

Patented Oct. 20, 1908.

Application filed July 5, 1907. Serial No. 382,328.

*To all whom it may concern:*

Be it known that I, DANIEL J. MURNANE, a citizen of the United States, residing at Kirkwood, Missouri, have invented a certain new and useful Improvement in Apparatus for Forming Sheets of Glass, of which the following is a full, clear, and exact description, such as will enable others skilled in the art to which it appertains to make and use the same, reference being had to the accompanying drawings, forming part of this specification, in which—

Figure 1:
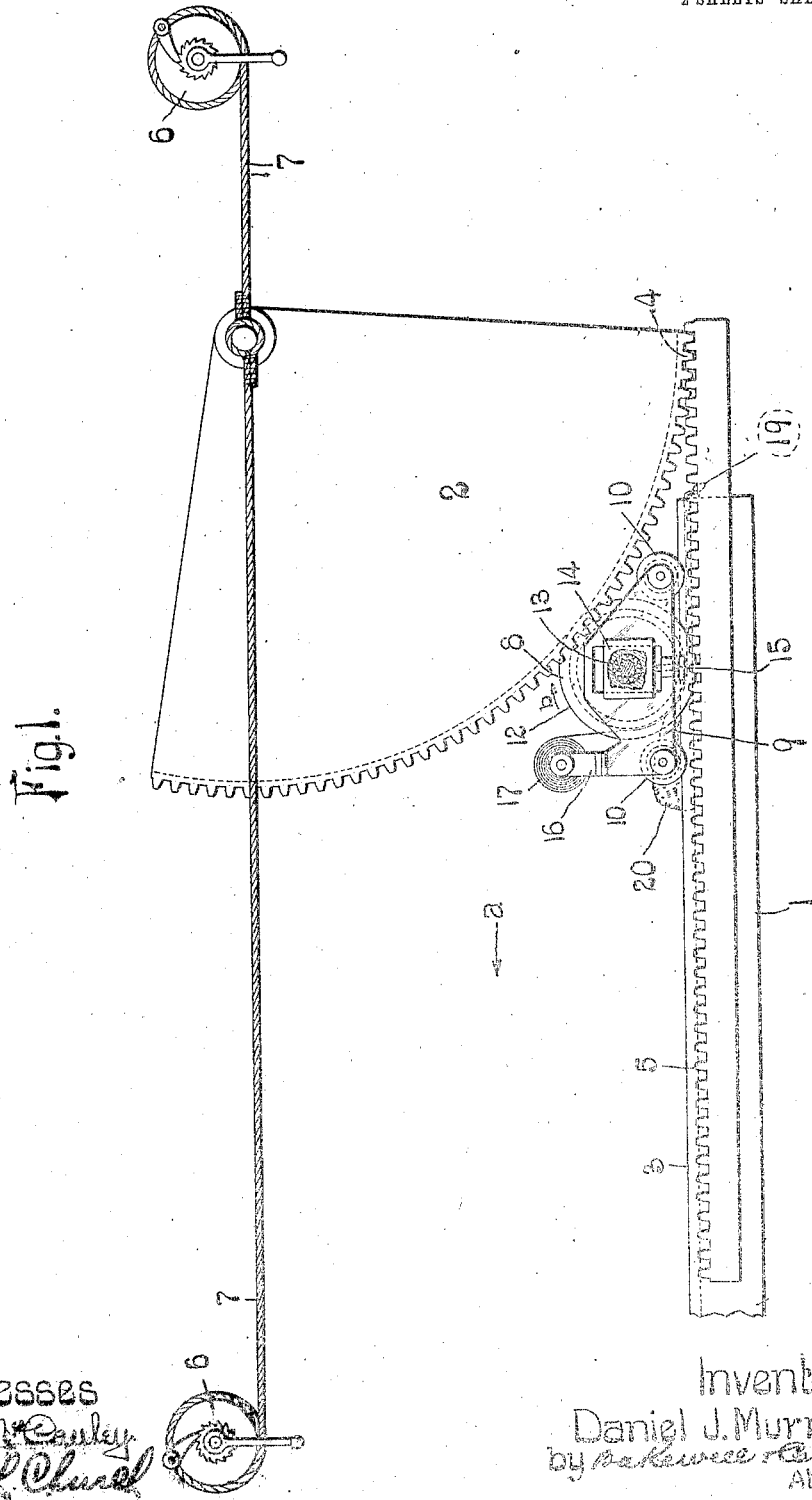
Figure 2:
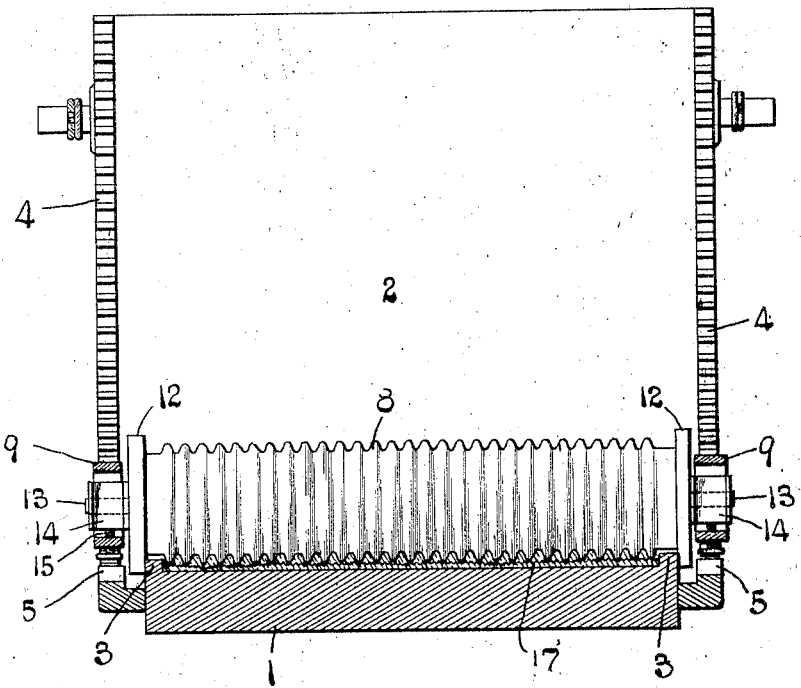
Figure 3:
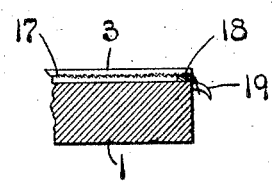

Figure 1 is a side elevation of an apparatus constructed in accordance with my invention; Fig. 2 is an end elevation looking from the lefthand end of Fig. 1, a portion of the truck being broken away and the supply of wire mesh also being omitted to more clearly show the construction of the embedding roller; and Fig. 3 is a detail sectional view of the righthand end of the casting table.

This invention relates to apparatuses for forming sheets of glass.

One object of my invention is to provide an apparatus which will produce a sheet of glass having one surface smooth and level so that it will not be necessary to grind off and polish both surfaces of the sheet to produce a merchantable product.

Another object of my invention is to provide an apparatus which will not trap air in the molten metal during the operation of forming it into a sheet, thereby producing a sheet of glass that is free from air bubbles.

Other desirable features of my invention will be hereinafter pointed out.

Briefly described, my apparatus comprises a casting table or level surface and a coöperating member having a curved surface of equal or greater area than the surface of the sheet that is formed and adapted to travel over the table with a rocking motion, thereby spreading the mass of molten glass evenly over the table and producing a sheet of glass having a smooth and level upper surface. The apparatuses which have heretofore been in general use for forming sheets of glass comprise a roller for spreading the mass of molten glass over the table so that the upper surface of the sheet is usually filled with transverse corrugations or ridges. Furthermore, as the roller travels over the table to spread the molten glass, air becomes trapped between the surface of the roller and the molten glass and thus causes air bubbles to form in the sheet. After the sheet has been formed both surfaces thereof are so rough and uneven that it is necessary to first grind off the faces and then polish them to produce a transparent plate of glass having straight and true surfaces and these grinding and polishing operations add greatly to the cost of producing the glass due to the fact that a great deal of the sheet is consumed. With my apparatus I am enabled to produce merchantable sheets of glass at a much lower cost than was heretofore possible due to the fact that only one surface of the sheet has to be ground off and polished.

Referring to the drawings which illustrate one form of my apparatus, 1 designates a casting table having a polished surface and 2 designates a segmental-shaped member having a curved polished surface of equal or greater area than the sheet to be formed and adapted to travel over the table with a rocking motion to spread the mass of molten glass thereover to form a sheet. The table is provided with the usual traings 3 which determine the thickness of the sheet to be formed and preferably the rocking member 2 is provided with rack teeth 4 which coöperate with rack teeth 5 on the table to prevent said member 2 from slipping. The rocking member may be operated manually but I prefer to provide mechanical means for moving it over the table, said means comprising two winding shafts or drums 6 having cables 7 connected thereto, said cables being secured to the rocking member at a point some distance from the curved surface thereof.

Instead of having the table 1 stationary said table can move longitudinally and the rocking member 2 be oscillatingly mounted on a fixed axis or bearing. The mass of molten glass to be formed into a sheet is dumped onto the table underneath the rocking member and said member is then actuated so that it will travel over the table and spread out the molten glass. As the rocking member travels over the table it will force the air ahead of it and thus prevent any air from becoming trapped between the surface of said member and the mass of molten glass so that no air bubbles will form in the sheet on account of the forming or molding operation. The curved surface of the member 2 is of equal or greater area than the sheet being formed so that no portion of said surface comes into contact with the molten glass a second time and consequently there is no possibility of the rocking member becoming excessively heated. A rocking member of this description can be used for making wire glass as well as plate glass and I have therefore illustrated the apparatus as comprising means for forcing a wire mesh into a mass of molten glass during the operation of forming said mass into a sheet. Said means consists of a corrugated embedding roller 8 mounted on a truck 9 provided with wheels 10 which travel on the trangs 3 on the table, the end portions of the embedding roller being provided with flanges 12 that contact with the curved surface of the rocking member 2. The embedding roller is provided with trunnions 13 that are mounted in ball bearings in blocks 14 on the truck and these blocks can be adjusted by means of screws 15 so as to vary the position of the embedding roller relatively to the table to change the position of the wire mesh in the sheet. The truck is provided with standards 16 for supporting a supply of wire mesh 17 and the table 1 is provided at its rear end with a block or spacer 18 which holds the wire mesh spaced away from the surface of the table, the end of the wire mesh being secured to hooks or projections 19 on the end of the table, as shown in Fig. 3. In making wire glass with an apparatus of this description, the end of the wire mesh is drawn down underneath the embedding roller 8 and is secured to the hooks or projections 19 on the table. A ladleful of molten glass 20 is then dumped onto the table in front of the embedding roller and the rocking member is moved over the table in the direction of the arrow $a$ in Fig. 1, the embedding roller forcing the wire mesh down into the molten glass and the rocking member 2 spreading out the molten glass to form a sheet having a smooth and even upper surface. As previously stated, the flanges 12 on the embedding roller contact with the curved surface of the rocking member so that said embedding roller will be rotated in the direction of the arrow $b$ in Fig. 1 as the rocking member moves the truck forwardly over the table and as the embedding roller rotates upwardly, away from the molten glass, it will not trap any air in the glass. In the wire glass apparatuses heretofore in use which employed an embedding roller, the roller always rotated in an opposite direction to that of the embedding roller 8 of my apparatus so that the embedding roller tended to trap air between the surface of the roller and the molten glass and thus caused air bubbles to form in the sheet. This objectionable feature is entirely overcome by my apparatus as the embedding roller rotates away from the mass of glass and thus throws the air upwardly so that no air can be trapped to form bubbles in the sheet. It is obvious that other means could be employed for embedding the wire, and instead of moving the truck forwardly by means of the rocking member, said truck could be drawn along manually.

Having thus described my invention, what I claim as new and desire to secure by Letters Patent is:

1. In an apparatus for making wire glass, a table and an embedding roller which travels over the table and rotates in a direction opposite to that in which it moves over the table; substantially as described.

2. An apparatus for making wire glass provided with a corrugated embedding roller which rotates upwardly away from the molten glass into which it forces the wire mesh; substantially as described.

3. An apparatus for making wire glass, comprising a table, an embedding roller adapted to travel over the table, and provided with means for forcing a piece of wire mesh into molten glass, and a member cooperating with the table to form the glass into a sheet and also adapted to rotate the embedding roller in a direction opposite to that in which it travels over the table; substantially as described.

4. An apparatus for making wire glass, comprising a table, a segmental-shaped rocking member adapted to travel over the table to form a mass of molten glass into a sheet, and a corrugated embedding roller provided with flanges of greater diameter than the ribs thereon, said flanges being adapted to contact with the curved surface of the rocking member so that the embedding roller will be moved forwardly and rotated as the rocking member travels over the table; substantially as described.

5. An apparatus for making wire glass, comprising a table, a segmental-shaped member adapted to move longitudinally over the table with a rocking motion to spread a mass of molten glass into sheet form and then come to rest out of contact with the top surface of said sheet, a truck that is moved longitudinally over the table by said member, means on said truck for carrying a supply of wire mesh, means on the table for securing one end of the piece of wire mesh and for holding it elevated from the table, and an adjustable device on said truck for embedding the wire mesh in the molten glass; substantially as described.

6. An apparatus for making wire glass, comprising a table, an embedding roller which travels over the table and rotates in a direction opposite to that in which it moves over the table for forcing a piece of wire mesh into a layer of molten glass, and means for finishing the top surface of said layer; substantially as described.

In testimony whereof I hereunto affix my signature in the presence of two witnesses, this twelfth day of June 1907.

DANIEL J. MURNANE.

Witnesses:
 WELLS L. CHURCH,
 GEORGE BAKEWELL.